(12) United States Patent
Kemmler

(10) Patent No.: US 11,883,884 B2
(45) Date of Patent: Jan. 30, 2024

(54) CUTTING TOOL AND MACHINE TOOL HAVING SUCH A CUTTING TOOL

(71) Applicant: Hartmetall-Werkzeugfabrik Paul Horn GmbH, Tuebingen (DE)

(72) Inventor: Tobias Kemmler, Kusterdingen (DE)

(73) Assignee: Hartmetall-Werkzeugfabrik Paul Hom GmbH, Tuebingen (DE)

( * ) Notice: Subject to any disclaimer, the term of this patent is extended or adjusted under 35 U.S.C. 154(b) by 0 days.

(21) Appl. No.: 17/735,377

(22) Filed: May 3, 2022

(65) Prior Publication Data

US 2022/0258254 A1 Aug. 18, 2022

Related U.S. Application Data

(63) Continuation of application No. PCT/EP2021/055512, filed on Mar. 4, 2021.

(30) Foreign Application Priority Data

Mar. 5, 2020 (DE) ..................... 10 2020 106 038.6

(51) Int. Cl.
*B23B 27/16* (2006.01)
*B23B 29/12* (2006.01)

(52) U.S. Cl.
CPC .............. *B23B 27/16* (2013.01); *B23B 29/12* (2013.01); *B23B 2260/128* (2013.01)

(58) Field of Classification Search
CPC ... B23B 2260/128; B23B 27/16; B23B 29/12; B23C 2260/76; B23Q 17/0966;
(Continued)

(56) References Cited

U.S. PATENT DOCUMENTS

| | | | |
|---|---|---|---|
| 4,671,147 A | * | 6/1987 | Komanduri ........ B23Q 17/0966 73/104 |
| 4,899,594 A | | 2/1990 | Wolfer et al. |

(Continued)

FOREIGN PATENT DOCUMENTS

| | | |
|---|---|---|
| CN | 102001023 A | 4/2011 |
| CN | 106584210 A | 4/2017 |

(Continued)

OTHER PUBLICATIONS

English translation of SE 442602 (Year: 1986).*

(Continued)

*Primary Examiner* — Alan Snyder
(74) *Attorney, Agent, or Firm* — Jason H. Vick; Sheridan Ross, PC

(57) ABSTRACT

Tool for machining a workpiece, comprising a cutting insert having at least one cutting edge, a cutting insert holder comprising a cutting insert receptacle for receiving the cutting insert, a clamping element acting as a clamping wedge, which can be fastened in the cutting insert receptacle for clamping the cutting insert in the cutting insert holder, a fastening element for fastening the clamping element in the cutting insert holder and simultaneously clamping the cutting insert in the cutting insert holder, and a sensor configured to generate a measurement signal that is dependent on a force acting on the cutting insert, wherein the clamping element comprises a recess in which the sensor is arranged.

17 Claims, 2 Drawing Sheets

(58) Field of Classification Search
CPC ............. B23Q 17/0952; B23Q 17/09; B23Q 17/2476; B23Q 17/2452; B23Q 17/2442
See application file for complete search history.

(56) References Cited

U.S. PATENT DOCUMENTS

| | | |
|---|---|---|
| 8,080,918 B2 | 12/2011 | Tzschentke et al. |
| 10,252,344 B2 | 4/2019 | Luik et al. |
| 2009/0165621 A1 | 7/2009 | Tzschentke et al. |
| 2017/0052530 A1 | 2/2017 | Agustin-Paya et al. |
| 2019/0358709 A1 | 11/2019 | Chen |
| 2022/0032416 A1 | 2/2022 | Fimpel et al. |

FOREIGN PATENT DOCUMENTS

| | | |
|---|---|---|
| CN | 107206505 A | 9/2017 |
| CN | 109922922 A | 6/2019 |
| DE | 102007005222 A1 | 8/2007 |
| DE | 102014224778 A1 | 6/2015 |
| DE | 102016223199 A1 | 5/2018 |
| DE | 102016223201 A1 | 5/2018 |
| EP | 0321599 A1 | 6/1989 |
| EP | 1984142 B1 | 7/2011 |
| JP | S47-12583 U | 10/1972 |
| JP | 2012-020359 A | 2/2012 |
| JP | 2018-502730 A | 2/2018 |
| JP | 2019-166600 A | 10/2019 |
| KR | 20170135186 A * | 12/2017 ......... B23Q 17/0966 |
| SE | 442602 B * | 1/1986 ............ B23Q 17/09 |
| SU | 1310118 A1 | 5/1987 |
| SU | 1620212 A1 | 1/1991 |
| SU | 1804951 A1 | 3/1997 |
| UA | 69021 A | 8/2004 |
| WO | WO 2007/088198 A1 | 8/2007 |
| WO | WO 2020/074434 A1 | 4/2020 |

OTHER PUBLICATIONS

International Preliminary Report on Patentability for International Application No. PCT/EP2021/055512, dated Sep. 15, 2022.
International Search Report for International Application No. PCT/EP2021/055512, dated Jun. 16, 2021.
Written Opinion for International Application No. PCT/EP2021/055512, dated Jun. 16, 2021.
Office Action (Including Translation) for corresponding Russian Patent Application No. 2022111492/05(024190), dated Dec. 26, 2022.
Notification of Reasons for Rejection (Including Translation) for corresponding Japanese Patent Application No. 2022-528927, dated Jun. 20, 2023.
First Office Action (Including Translation) for corresponding Chinese Patent Application No. 202180007295.3, dated Mar. 31, 2023.

* cited by examiner

CUTTING TOOL AND MACHINE TOOL HAVING SUCH A CUTTING TOOL

CROSS-REFERENCE TO RELATED APPLICATIONS

This application is a continuation of international patent application PCT/EP2021/055512, filed on Mar. 4, 2021 designating the U.S., which international patent application has been published in German language and claims priority from German patent application DE 10 2020 106 038.6, filed on Mar. 5, 2020. The entire contents of these priority applications are incorporated herein by reference.

BACKGROUND

This disclosure relates to a tool for machining a workpiece, wherein the tool comprises, in particular, a cutting insert and a sensor which is configured to generate a measurement signal that is dependent on a force acting on the cutting insert. Furthermore, the disclosure relates to a machine tool having such a tool and an evaluation unit which is connected to the sensor via a data link.

The herein presented tool can basically be any type of cutting tool. Preferably, the tool is a turning tool or a milling tool.

The use of sensors to monitor various forces acting on the tool is already known in principle from the prior art.

EP 1 984 142 B1, for example, discloses that piezoceramic sensors can be used to measure the compressive, tensile and shear forces exerted on the cutting body or the holder of the tool and to control the machine tool in such a way that damage due to overloading is prevented. Thereby, threshold values are specified for the forces, wherein the machining process intervened if said threshold values are exceeded.

Another tool in which one or more sensors are used on the tool for the purpose of preventive fracture, crack and/or wear detection of the cutting insert is disclosed in DE 10 2014 224 778 A1.

However, the use of such sensors in cutting tools does not necessarily have to serve to detect breakage or wear of the cutting insert. In principle, the sensors can also be used for quality assurance and/or documentation. For example, such sensors can be used to record the forces acting on the cutting insert of the tool during machining over time and to store them for documentation purposes.

Regardless of the purpose for which such a sensor is used on a cutting tool, there is often the problem of locating the sensor or sensors in a suitable place within the machine tool or within the tool itself.

To enable a measurement that is as accurate as possible, it is generally desirable to use the sensor as close as possible to the processing point, i.e. as close as possible to the cutting edge of the tool. However, this is often problematic not only for space reasons, but also for pure stability reasons. For example, in the case of tools with replaceable cutting inserts that are clamped in a cutting insert holder, it is only possible to a limited extent to mount a sensor in the cutting insert holder directly between the cutting insert and the cutting insert holder. While this would allow a measurement very close to the cutting edge, such an attachment is rather unsuitable for the tools known from the prior art for purely mechanical reasons, since the sensor could impair the stability of the clamping of the cutting insert.

On the other hand, mounting the sensor at the connection point where the tool or the cutting insert holder is clamped in the machine tool is much easier to ensure for reasons of both space and stability. However, due to the larger distance to the machining point, such an attachment of the sensor leads to a lower accuracy of the measurement.

SUMMARY

It is an object to provide a cutting tool having a sensor, wherein the sensor is to be used as close to the cutting edge as possible, but without negatively affecting the mechanical stability of the tool.

According to a first aspect, a tool is provided, which comprises:
a cutting insert having at least one cutting edge
a cutting insert holder comprising a cutting insert receptacle for receiving the cutting insert,
a clamping element acting as a clamping wedge, that is configured to be fastened in the cutting insert holder for clamping the cutting insert in the cutting insert holder,
a fastening element for fastening the clamping element in the cutting insert holder and simultaneously clamping the cutting insert in the cutting insert holder, and
a sensor configured to generate a measurement signal that is dependent on a force acting on the cutting insert, wherein the clamping element comprises a recess in which the sensor is arranged.

According to a further aspect, there is further provided a machine tool comprising such a tool and an evaluation unit connected to the sensor via a data link. The evaluation unit may be configured to evaluate the measurement signal and to store it in a memory unit for documentation purposes. Likewise, the evaluation unit can be configured to evaluate the measurement signal and to control the machine tool based on the evaluated measurement signal and/or to generate a warning signal if the measurement signal exceeds a predefined threshold value or has a predefined signal pattern.

The herein presented tool is distinguished in the way the sensor is attached to the tool. The sensor is arranged in a recess provided in the clamping element. The clamping element serves as a clamping wedge for clamping the cutting insert in the cutting insert holder and, for this purpose, is fastened together with the cutting insert in the cutting insert holder. The clamping element is fastened in the cutting insert holder by means of a separate fastening element.

Mounting the sensor in the recess of the clamping element has the following advantages: First, this enables a very space-saving arrangement of the sensor. The mounting of the cutting insert within the cutting insert holder is hardly affected by this way of mounting the sensor. Nevertheless, the sensor can be arranged in this way in the immediate vicinity of the cutting insert and thus very close to the processing point of the workpiece. The sensor is therefore hardly exposed to interfering influences. Due to the arrangement in the recess of the clamping element, the sensor does also not collide with other components of the tool. Another significant advantage is that the clamping element, which acts as a clamping wedge, allows very precise adjustment of the position and clamping force of the sensor. All in all, this makes it possible to ensure very accurate measurement by means of the sensor without the stability of the tool being affected by the sensor.

According to a refinement, the sensor may be arranged in the recess with an exact fit or with some play. The recess may be configured as a depression in one of the two clamping surfaces of the clamping element. The shape of the recess can be arbitrary, e.g. round or rectangular in plan view.

According to a further refinement, the sensor may be arranged locally between the clamping element and the cutting insert holder. This is usually advantageous for reasons of both space and stability compared to mounting locally between the clamping element and the cutting insert.

It should be noted, however, that the sensor may alternatively be arranged between the clamping element and the cutting insert without departing from the spirit and scope of the present disclosure.

According to a further refinement, the sensor may be in direct contact with both the clamping element and the cutting insert holder in a mounted state of the tool. The sensor preferably makes direct contact with both components of the tool.

This essentially has the advantage of direct force transmission of the forces acting between the clamping element and the cutting insert holder to the sensor. Since these forces are dependent on the forces acting on the cutting insert, a very accurate measurement result can thus be achieved.

According to another refinement, the sensor may comprise a force sensor.

Such force sensors are often also referred to as force transducers. In principle, any type of force sensor can be used in accordance with this disclosure. For example, the sensor can be a spring body force transducer, a piezoelectric force transducer, an inductive force transducer, a capacitive force transducer, an electrodynamic force transducer, a resistive force transducer or a magnetoelastic force transducer.

In most cases, force measurement in such force sensors is performed by measuring elastic deformation through displacement or pressure or resistance measurement based on one of the aforementioned measurement principles.

The sensor may also comprise a multi-axis force sensor. This has the advantage that multi-dimensional forces can be measured and evaluated. For example, such a multi-axis force sensor can be used to measure the feed force of the tool in addition to the pure cutting or machining force.

At this point, it should be noted that the term "sensor" (in the singular) is usually used here. In principle, however, it is also possible to arrange several sensors at the mentioned location on or in the clamping element without leaving the spirit and scope of the present disclosure. Likewise, it is possible to arrange additional sensors at various other locations on the tool without leaving the spirit and scope of the present disclosure.

According to a further refinement, the clamping element may be substantially wedge-shaped. The description "substantially wedge-shaped" refers in particular to the geometric configuration considered in the side view of the clamping element. The clamping element is preferably prismatic in its overall geometry and trapezoidal or wedge-shaped in the side view or in the longitudinal cross section.

The clamping element may comprise two clamping surfaces running at an angle to one another, with one of the clamping surfaces resting against the cutting insert and the other clamping surface resting against the cutting insert holder. According to a refinement, these two clamping surfaces may extend at an angle <15° to each other.

Such an inclination of the two clamping surfaces to each other has the particular advantage that a so-called self-locking effect occurs between the clamping element and the cutting insert holder. This self-locking effect means that the clamping element together with the cutting insert holder cannot be easily detached from the cutting insert holder in the fully mounted state of the tool. This is also the case when the fastening element for fastening the clamping element is released. To realize this self-locking effect, an angle between the two clamping surfaces in the range of 5°-10° is particularly preferred.

According to a further refinement, the clamping element may extend from a front end along a longitudinal axis of the clamping element to a rear end that faces a base of the cutting insert receptacle, wherein the clamping element may taper in height perpendicular to the longitudinal axis of the clamping element toward the rear end in a wedge shape.

The width of the clamping element, which is also measured perpendicular to the longitudinal axis of the clamping element, is preferably constant along the entire longitudinal axis of the clamping element. The height of the clamping element, which is measured perpendicular to the longitudinal axis of the clamping element and perpendicular to the width of the clamping element, preferably decreases continuously from the front end to the rear end of the clamping element. This results in a kind of wedging of the cutting insert during fastening of the clamping element in the cutting insert holder, which leads to clamping of the cutting insert in the cutting insert holder. During the fastening of the clamping element, the clamping element is pulled further and further into the cutting insert holder, whereby the clamping force exerted on the cutting insert is increased more and more.

If the clamping element tapers towards its rear end in a continuous manner, the clamping force also increases continuously during fastening of the clamping element in the cutting insert holder. This is particularly advantageous in the present case, since the sensor is located between the clamping element and the cutting insert holder. The continuous increase in force of the fastening of the clamping element thus also leads to a continuous increase in force on the sensor. The sensor can therefore be optimally adjusted and its pretensioning force can be optimally set. This in turn enables very precise measurement results to be achieved by means of the sensor.

According to a further refinement, it is preferred that a height of the sensor is larger than a depth of the recess measured parallel thereto so that the sensor protrudes beyond an edge of the recess.

The sensor thus protrudes slightly upwards from the recess. In this way, a preload of the sensor can be created, as the sensor is already clamped under preload between the clamping element and the cutting insert holder in the mounted state of the tool before the tool is used.

According to a further refinement, the sensor may comprise a cable that is guided from the interior of the tool to the exterior via a first cable duct section arranged in the clamping element and opening into the recess, and a second cable duct section arranged in the cutting insert holder and aligned with the first cable duct section in a mounted state of the tool.

In principle, it would also be possible to equip the sensor with a transmitter unit, e.g. a radio transmitter, in order to establish a wireless data connection with the evaluation unit of the machine tool. However, for space reasons this is usually not possible. In addition, a more robust data connection that is less susceptible to interference can usually be implemented in the present application by means of a wired data connection.

The two aforementioned cable duct sections, which are aligned with each other when the mold is mounted, ensure a simple way of routing the sensor's cable from inside the mold to the outside. Both cable duct sections can be of any shape. Preferably, the two cable duct sections are each formed as a recess in the clamping element or in the cutting insert holder.

According to a further refinement, the clamping element may be adapted to the shape of the cutting insert holder in such a way that it is at least predominantly recessed in the cutting insert holder when the tool is mounted. By "at least predominantly" it is meant that at least 50% of the volume of the clamping element is recessed in the cutting insert holder in the mounted state of the tool. Preferably, at least 90% of the volume of the clamping element is recessed in the cutting insert holder in the mounted state of the tool.

In the mounted state of the tool, the clamping element therefore preferably no longer protrudes or only protrudes slightly from the cutting insert holder. This effectively prevents collisions, in particular with the workpiece to be machined.

According to a further refinement, the cutting insert receptacle may comprise a clamping surface which is inclined at an angle with respect to the longitudinal axis of the clamping element, faces a first side of the clamping element and against which the sensor abuts in the mounted state of the tool, wherein a second side of the clamping element, which is opposite the first side and extends parallel to the longitudinal axis of the clamping element, may abut against the cutting insert at least in regions in the mounted state of the tool.

The clamping element is preferably arranged above the cutting insert in the cutting insert holder. This proves to be particularly advantageous with regard to the stability of the clamping of the cutting insert. Since the sensor, as already mentioned, preferably protrudes above the recess in the clamping element in which it is arranged, the first side of the clamping element does not touch the clamping surface of the cutting insert receptacle. Instead, only the sensor touches this clamping surface. The sensor preferably protrudes up to 1-2 mm beyond the first side of the clamping element.

According to a further refinement, the fastening element may comprise a screw, the clamping element may comprise a through hole, and the cutting insert holder may comprise an internal thread in which the screw may engage through the through hole in a mounted state of the tool.

In the mounted state of the tool, the screw is preferably aligned parallel to the longitudinal axis of the cutting insert holder and parallel to the longitudinal axis of the clamping element. The screw can thus be relatively easily inserted through the clamping element into the cutting insert holder and screwed tight in order to clamp the cutting insert in the cutting insert holder by means of the clamping element. For this purpose, the clamping element has a bore whose bore axis is preferably aligned parallel to the longitudinal axis of the cutting insert holder and parallel to the longitudinal axis of the clamping element in the assembled state. The screw can also be designed as a differential screw, in which case an internal thread is arranged in the through-bore of the clamping element, which is in the opposite direction to the internal thread arranged in the cutting insert holder.

According to a further refinement, the clamping element and the cutting insert holder may be made of steel, and the cutting insert may be made of carbide. Among other things, this improves the stability of the connections between the cutting insert holder, cutting insert and clamping element.

It should be understood that the above features and those yet to be explained below can be used not only in the combination indicated in each case, but also in other combinations or on their own, without departing from the spirit and scope of the present disclosure.

DESCRIPTION OF PREFERRED EMBODIMENTS

Figure 1:
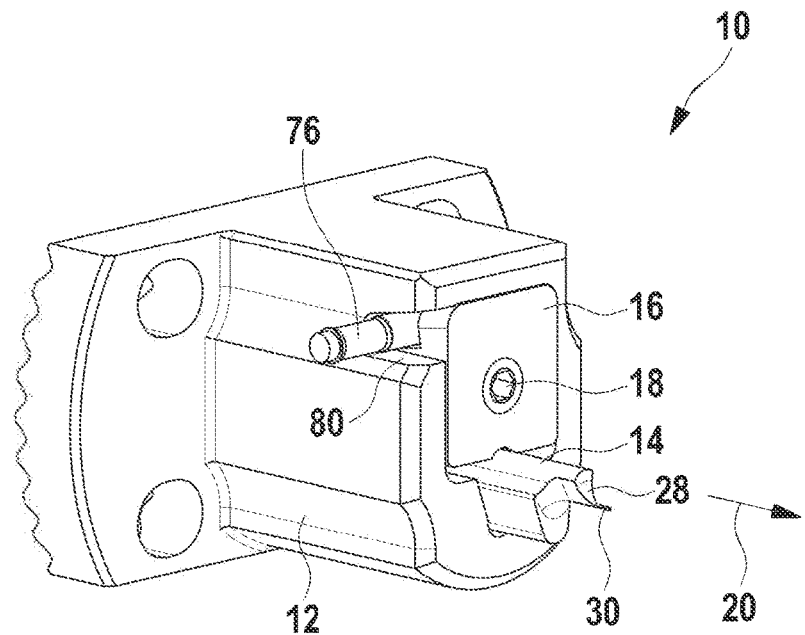
FIG. 1 a perspective view of an embodiment of the tool.
Figure 2:
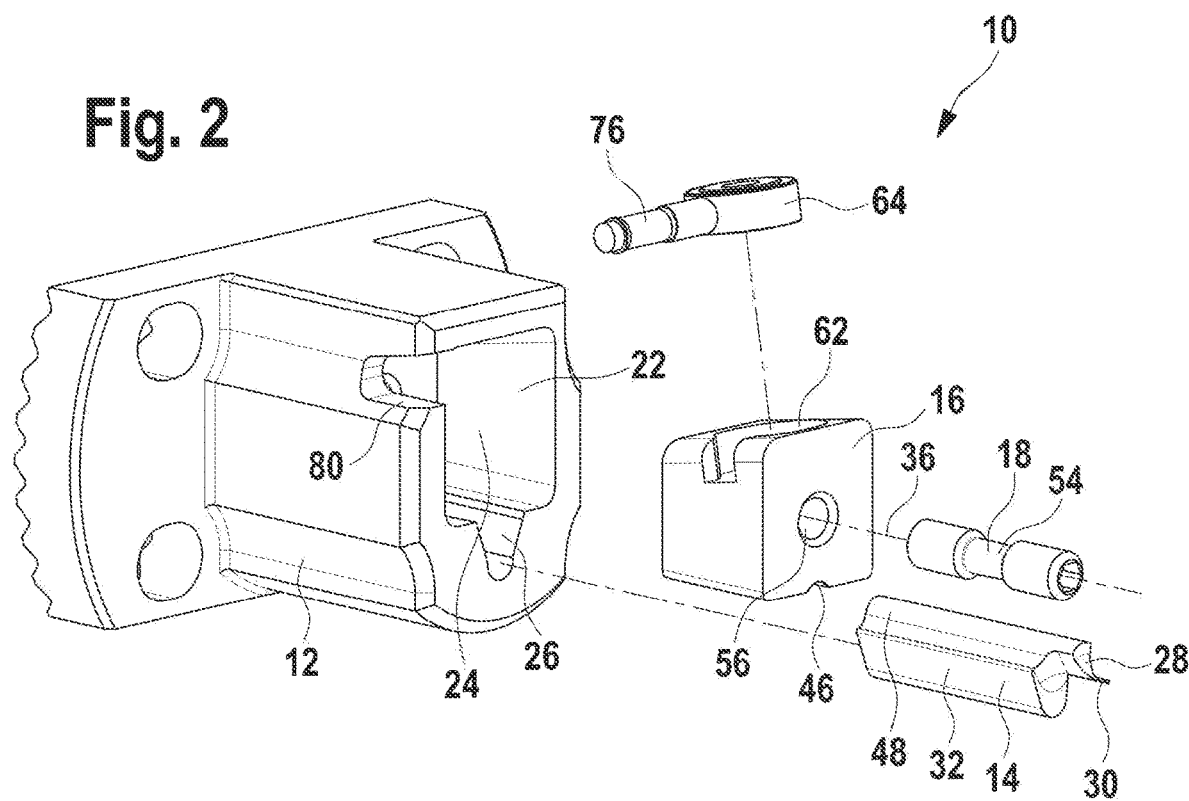
FIG. 2 an exploded view of the tool shown in FIG. 1.
Figure 3:
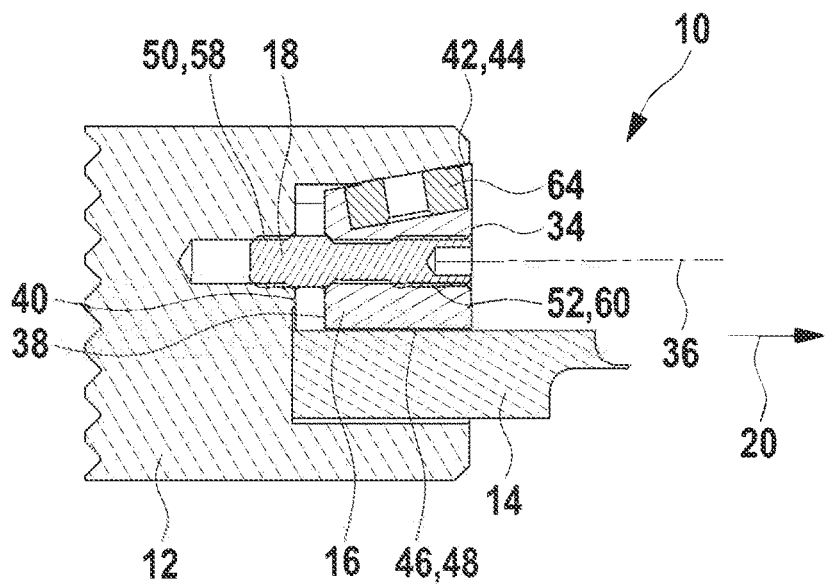
FIG. 3 a longitudinal sectional view of the tool shown in FIG. 1.
Figure 4:
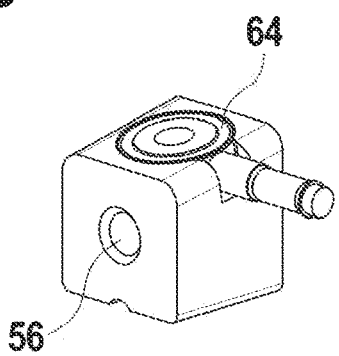
FIG. 4 a perspective view of an embodiment of a clamping element that can be used in the tool with a sensor inserted therein.

FIGS. 1-3 show an embodiment of the tool in a perspective view, an exploded view and a longitudinal section view. The is denoted therein in its entirety with the reference numeral 10.

The tool 10 comprises a cutting insert holder 12 and a replaceable cutting insert 14, which can be fastened in or on the cutting insert holder 12 by means of a clamping element 16. The clamping element 16 can in turn be fastened in or to the cutting insert holder 12 by means of a fastening element 18. In the mounted state of the tool 10, the cutting insert 14 is clamped between the clamping element 16 and the cutting insert holder 12.

The cutting insert holder 12 extends essentially along a longitudinal holder axis, which is indicated by an arrow 20 in FIG. 1. It comprises a cutting insert receptacle 22 at a front end, which in the present case is essentially pot-shaped. This cutting insert receptacle 22, which is configured as a pot-shaped recess, forms a kind of blind hole in the cutting insert holder 12.

The cutting insert receptacle 22 serves not only to receive the cutting insert 14, but also to receive the clamping element 16. The cutting insert receptacle 22 comprises an upper part 24 and a lower part 26 (see FIG. 2). The upper part 24 serves to receive the clamping element 16. The lower part 26 serves to receive the cutting insert 14. Both parts 24, 26 are open to each other, i.e. not separated from one another by walls. The upper part 24, viewed transversely to the holder longitudinal axis 20, preferably has a larger cross-section than the lower part 26. Accordingly, the clamping element 16 also preferably has a larger cross-section than the cutting insert 14.

The cutting insert 14 comprises a cutting head 28 having a cutting edge 30 arranged thereon and a clamping section 32. The clamping section 32 serves to clamp the cutting insert 14 in the cutting insert holder 12.

The clamping element 16 is used for clamping the cutting insert 14. Both the cutting insert 14 and the clamping element 16 are provided as separately replaceable parts, which are not firmly or permanently connected to each other.

The clamping element 16 is essentially wedge-shaped. This is particularly apparent from the longitudinal sectional view of the tool 10 shown in FIG. 3. Starting from a front end, it tapers in a wedge shape in its height measured perpendicular to the longitudinal axis 36 of the clamping element 16 towards its rear end 38. In the mounted state of the tool 10, the rear end 38 of the clamping element 16 faces an inner base 40 of the cutting insert receptacle 22. At its upper end, the clamping element 16 comprises a clamping surface 42 which, in the mounted state of the tool 10, can abut against a corresponding clamping surface 44 of the cutting insert holder 12 (provided that the sensor 64 does not protrude upwardly beyond the clamping surface 42 at this point, see further below). The two clamping surfaces 42, 44 extend at an oblique angle with respect to the longitudinal axis 36 of the clamping element 16 or with respect to the holder longitudinal axis 20 extending parallel thereto. Preferably, the clamping surfaces 42, 44 enclose an angle of <15°, particularly preferably an angle of 5°-10°, with the longitudinal axis 36 of the clamping element 16 or the holder longitudinal axis 20. On its bottom side, the clamping element 16 comprises a concave-shaped clamping surface 46, which abuts against a correspondingly convex-shaped clamping surface 48, which is formed on the upper side of the clamping section 32 of the cutting insert 14.

As already mentioned, the clamping element 16 itself is fastened in the cutting insert holder 12 by means of a fastening element 18. This fastening element 18 is configured as a screw in the present embodiment. More precisely, this screw 18 is configured as a differential screw. It comprises two opposing external threads 50, 52, which are separated from one another in the area of the center of the screw 18 by a circumferential groove 54 (see FIG. 2).

The screw 18 is threaded into the cutting insert holder 12 through a through hole 56 provided in the clamping element 16. This through hole 56 extends along the longitudinal axis 36 of the clamping element 16. The first external thread 50 of the screw 18 engages a first internal thread 58 arranged in the cutting insert holder 12. The second external thread 52 of the screw 18 engages a second internal thread 58 of the screw 18 engages a second internal thread 60 formed in the through bore 56 of the clamping element 16. The first internal thread 58 provided in the cutting insert holder 12 and the second internal thread 60 provided in the clamping element 16 are configured to correspond to the two external threads 50, 52 of the screw 18 in opposite directions.

The opposing configuration of the external threads 50, 52 and the internal threads 58, 60 has the advantage that the clamping element 16 is actively pushed out of the cutting insert receptacle 22 during loosening of the differential screw 18. Clamping element 16 and cutting insert 14 can thus be removed more easily, for example, when replacing a cutting insert. At the same time, this type of configuration also has the advantage that the clamping element 16 is pulled into the cutting insert receptacle 22 by means of just a few turns of the differential screw 18 during the tightening of the differential screw 18 or during the mounting of the clamping element 16 and the cutting insert 14.

However, it is understood that, in principle, another type of screw or even a completely different type of fastening element can be used to secure the clamping element 16.

The clamping element 16 comprises a recess 62 in which a sensor 64 is arranged. Preferably, the sensor 64 is a force sensor that is used to measure a force applied to the cutting insert 14. Particularly preferably, the sensor 64 is a multi-axis force sensor that is configured to measure the forces acting on the cutting insert 14 in all three dimensions.

The sensor 64 arranged in the recess 62 of the clamping element 16 is clamped between the clamping element 16 and the cutting insert holder 12 in the mounted state of the tool 10. It thus measures the force acting between the clamping element 16 and the cutting insert holder 12. Since this force acting between the clamping element 16 and the cutting insert holder 12 is dependent on the force acting on the cutting insert 14, the measurement signal generated by the sensor 64 is also dependent on the force acting on the cutting insert 14.

The recess 62 is configured as a depression provided in the clamping surface 42 of the clamping element 16. Preferably, the recess 62 is dimensioned in such a way that the sensor 64 can be accommodated therein with an exact fit. However, the depth of the recess 62 is preferably dimensioned somewhat less than the height of the sensor 64 measured parallel thereto. This has the consequence that the sensor 64 projects upwardly somewhat beyond the edge 66 of the recess 62. Preferably, the sensor 64 protrudes only a few micrometers above the edge 66 of the recess 62. However, it may protrude up to 1-2 mm above the recess 62. This improves the clamping of the sensor 64 between the clamping element 16 and the cutting insert holder 12 and creates a preload of the sensor 64, which in turn enables an improved signal evaluation.

A particular advantage in the way the sensor 64 is mounted within the clamping element 16 is that, on the one hand, it is accommodated in a very space-saving manner due to its arrangement in the recess 62. On the other hand, the stability of the clamping of the cutting insert 14 is hardly affected by the sensor 64. Another significant advantage of the arrangement of the sensor 64 within the recess 62 of the clamping element 16 is that the position of the sensor 64 as well as its pretension can be adjusted very easily and yet very precisely together with the position of the clamping element 16 and its pretension. Furthermore, the described type of arrangement of the sensor 64 has the advantage that the machining forces can be measured very close to the cutting edge due to the proximity to the cutting insert 14. Overall, this enables a very precise and robust measurement of the forces acting on the cutting insert 14 by means of the sensor 64.

Figure 6:
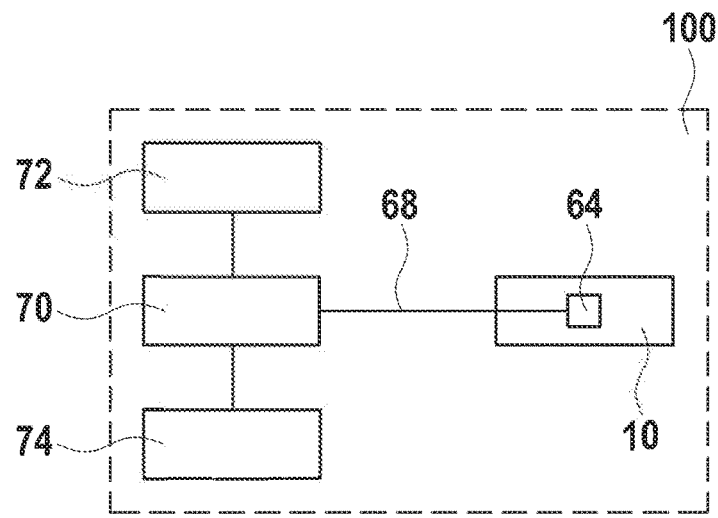
FIG. 6 a schematic block diagram of a machine tool according to an embodiment.

As schematically indicated in FIG. 6, the measurement signal generated by the sensor 64 can be fed via a data connection 68 to an evaluation unit 70, which is configured to evaluate the measurement signal and process it accordingly. The evaluation unit 70 can, for example, be part of a machine tool 100 in which the tool 10 is used. However, the evaluation unit 70 can in principle also be designed as a separate unit that is not directly integrated into the machine tool 100.

Various possibilities are conceivable with regard to the evaluation and further processing of the measurement signal generated by the sensor 64. The evaluation unit 70 can be configured to store the measurement signal in a memory device 72, for example for the purpose of documentation or quality assurance. It is also possible that the evaluation unit 70 is configured to control the machine tool 100 based on the measurement signal. For example, the evaluation unit 70 may be configured to cause the machine tool 100 to stop if the measurement signal exceeds a predefined threshold or has a predefined signal pattern that allows conclusions to be drawn about a damaged or worn cutting edge 30 of the cutting insert 14. According to a further embodiment, the evaluation unit 70 may be configured to generate a warning signal via an output unit if the measurement signal generated by the sensor 64 exceeds a predefined threshold or exhibits a predefined signal pattern. The output unit 74 may include a screen on which the warning signal is visually displayed as an on-screen display. Likewise, the output unit 74 may include a speaker through which the warning signal is acoustically generated.

Figure 5:
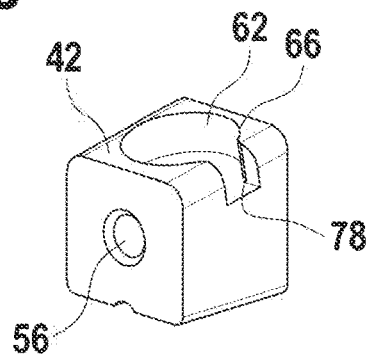
FIG. 5 a perspective view of the clamping element shown in FIG. 4 without a sensor inserted therein.

The data connection 68 can be configured both as a wireless and as a wired data connection. In the present embodiment, the data connection 68 is preferably configured as a wired data connection. For this purpose, the sensor 64 comprises a cable 76 which is led laterally out of the clamping element 16 and the cutting insert holder 12. In the clamping element 16, a first cable duct section 78 is provided for this purpose, which opens into the recess 62 (see FIG. 5). A second cable duct section 80 is provided in the cutting insert holder 12, which is aligned with the first cable duct section 78 in the mounted state of the tool 10 (see FIGS. 1 and 2). Both cable duct sections 78, 80 are each formed as a recess which is introduced laterally into the clamping element 16 or laterally into the cutting insert holder 12, respectively.

Finally, it should be mentioned that the presently shown embodiment of the tool 10 is only one arbitrary embodiment of many possible embodiments. The cutting insert holder 12 does by no means need to be a cassette holder, as shown herein. It is equally possible for the cutting insert holder 12 to be a purely beam-shaped holder, as is common for conventional turning tools. Likewise, the cutting insert holder 12 can be of cylindrical design. Also, the cutting insert 14 may in principle differ in shape from that shown herein without departing from the spirit and scope of the present disclosure. For example, the cutting insert 14 can also be configured as a plate-shaped or rod-shaped indexable insert. The cutting insert receptacle does not necessarily need to be pot-shaped, as shown herein. Instead, the cutting insert holder 22 can also be configured by means of two clamping jaws which are formed on the cutting insert holder 12 and between which the clamping element 16 and the cutting insert 14 can be clamped.

What is claimed is:

1. A tool configured to machine a workpiece, comprising:
   a cutting insert having at least one cutting edge;
   a cutting insert holder comprising a cutting insert receptacle configured to receive the cutting insert;
   a clamping element configured to be fastened in the cutting insert receptacle and configured to clamp the cutting insert in the cutting insert receptacle between the clamping element and the cutting insert holder;
   a fastening element configured to fasten the clamping element in the cutting insert holder and thereby clamp the cutting insert in the cutting insert receptacle; and
   a sensor configured to generate a measurement signal that is dependent on a force acting on the cutting insert;
   wherein the clamping element comprises a recess in which the sensor is arranged, and
   wherein the cutting insert and the sensor are arranged at opposite sides of the clamping element, with a portion of the clamping element being interposed between the cutting insert and the sensor.

2. The tool according to claim 1, wherein the sensor is arranged between the clamping element and the cutting insert holder.

3. The tool according to claim 2, wherein the sensor is in direct contact with both the clamping element and the cutting insert holder.

4. The tool according to claim 1, wherein the sensor comprises a force sensor.

5. The tool according to claim 1, wherein the clamping element is wedge-shaped.

6. The tool according to claim 1, wherein the clamping element extends from a front end along a longitudinal axis of the clamping element to a rear end that faces a base of the cutting insert receptacle, and wherein the clamping element tapers in height perpendicular to the longitudinal axis of the clamping element toward the rear end.

7. The tool according to claim 1, wherein a height of the sensor is larger than a depth of the recess measured parallel to the height of the sensor.

8. The tool according to claim 1, wherein the sensor comprises a cable that is guided from an interior of the tool to an exterior via a first cable duct section arranged in the clamping element and opening into the recess, and via a second cable duct section arranged in the cutting insert holder and aligned with the first cable duct section.

9. The tool according to claim 1, wherein a shape of the clamping element is adapted to a shape of the cutting insert holder in such a way that more than 50% of the clamping element is recessed in the cutting insert holder.

10. The tool according to claim 1, wherein the cutting insert receptacle comprises a clamping surface which is inclined at an angle with respect to a longitudinal axis of the clamping element, faces a first side of the clamping element and against which the sensor abuts, and wherein a second side of the clamping element, which is opposite the first side and extends parallel to the longitudinal axis of the clamping element, abuts against the cutting insert.

11. The tool according to claim 1, wherein the fastening element comprises a screw, the clamping element comprises a through bore, and the cutting insert holder comprises an internal thread in which the screw engages through the through bore.

12. The tool according to claim 11, wherein the through bore extends parallel to a longitudinal axis of the clamping element which, in a mounted state of the tool, is aligned parallel to a longitudinal axis of the cutting insert holder.

13. The tool according to claim 1, wherein the clamping element and the cutting insert holder are made of steel and the cutting insert is made of carbide.

14. A machine tool comprising:
    a tool, said tool comprising:
       a cutting insert having at least one cutting edge;
       a cutting insert holder comprising a cutting insert receptacle configured to receive the cutting insert;
       a clamping element configured to be fastened in the cutting insert receptacle and configured to clamp the cutting insert in the cutting insert receptacle between the clamping element and the cutting insert holder;
       a fastening element configured to fasten the clamping element in the cutting insert holder and thereby clamp the cutting insert in the cutting insert receptacle; and
       a sensor configured to generate a measurement signal that is dependent on a force acting on the cutting insert, wherein the clamping element comprises a recess in which the sensor is arranged, and wherein the cutting insert and the sensor are arranged at opposite sides of the clamping element, with a portion of the clamping element being interposed between the cutting insert and the sensor;
    wherein the machine tool further comprises an evaluation unit connected to the sensor via a data link.

15. The machine tool according to claim 14, wherein the evaluation unit is configured to evaluate the measurement signal, and
    (i) to store the measurement signal in a memory device; and/or
    (ii) to control the machine tool based on the evaluated measurement signal; and/or
    (iii) to generate a warning signal if the measurement signal exceeds a predefined threshold value or has a predefined signal pattern.

16. A tool configured to machine a workpiece, comprising:
- a cutting insert having at least one cutting edge;
- a cutting insert older comprising a cutting insert receptacle configured to receive the cutting insert;
- a clamping element configured to be fastened in the cutting insert receptacle and configured to clamp the cutting insert in the cutting insert receptacle between the clamping element and the cutting insert holder;
- a fastening element configured to fasten the clamping element in the cutting insert holder and thereby clamp the cutting insert in the cutting insert receptacle; and
- a sensor configured to generate a measurement signal that is dependent on a force acting on the cutting insert;
- wherein the clamping element comprises a recess in which the sensor is arranged, wherein the sensor is arranged between the clamping element and the cutting insert holder, and wherein the sensor is in direct contact with both the clamping element and the cutting insert holder.

17. A tool configured to machine a workpiece, comprising:
- a cutting insert having at least one cutting edge;
- a cutting insert, holder comprising a cutting insert, receptacle configured to receive the cutting insert;
- a clamping element configured to be fastened in the cutting insert holder and configured to clamp the cutting insert in the cutting insert holder;
- a fastening element configured to fasten the clamping element in the cutting insert holder and thereby clamp the cutting insert in the cutting insert holder; and
- a sensor configured to generate a measurement signal that is dependent on a force acting on the cutting insert;
- wherein the clamping element comprises a recess in which the sensor is arranged, the clamping element being surrounded on at least four sides by the cutting insert holder when the clamping element is fastened in the cutting insert holder.

* * * * *

UNITED STATES PATENT AND TRADEMARK OFFICE
CERTIFICATE OF CORRECTION

PATENT NO. : 11,883,884 B2
APPLICATION NO. : 17/735377
DATED : January 30, 2024
INVENTOR(S) : Tobias Kemmler It is certified that error appears in the above-identified patent and that said Letters Patent is hereby corrected as shown below:

On the Title Page

Item (73) "Assignee", Column 1, Line 9, please delete "Hom" and insert -- HORN --, therefore.

Signed and Sealed this
Second Day of April, 2024

*Katherine Kelly Vidal*

Katherine Kelly Vidal
*Director of the United States Patent and Trademark Office*